2,965,636

NORLEUCINE DERIVATIVES AND PROCESS FOR PRODUCING SAME

Alexander M. Moore, Grosse Pointe Farms, and Horace A. De Wald, Grosse Pointe Woods, Mich., assignors to Parke, Davis & Company, Detroit, Mich., a corporation of Michigan No Drawing. Filed Jan. 15, 1958, Ser. No. 708,969

8 Claims. (Cl. 260—239)

This application is a continuation-in-part of our co-pending applications Serial Number 530,486, filed August 25, 1955, now abandoned, and Serial Number 570,418, filed March 9, 1956, and the invention relates to a process for producing 6-diazo-5-oxonorleucines and to certain intermediate norleucine derivatives produced in said process.

In accordance with the invention 6-diazo-5-oxonorleucines which have the formula,

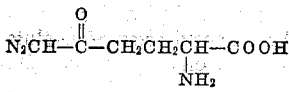

are produced by subjecting an α-benzyl ester of glutamic acid to halogenation, reacting the resulting 4-carbobenzoxy-4-amino-butyryl halide hydrohalide with diazomethane to obtain a benzyl ester of 6-diazo-5-oxonorleucine, hydrolyzing the ester and neutralizing the hydrolysis product to liberate the free amino acid, 6-diazo-5-oxonorleucine. These transformations can be illustrated as follows:

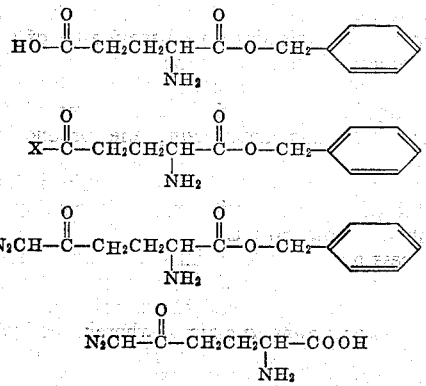

where X is a chlorine or bromine atom.

From the formulas given above it will be seen that the 6-diazo-5-oxonorleucine exists in the optically active D and L forms as well as the optical racemic DL form and that the same is true of the intermediate products and starting products used in the preparation of these substances. It is to be understood that the formulas throughout the specification and claims, in the absence of a designation to the contrary, represent the D-optical isomer, the L-optical isomer or the DL-optically inactive form of the chemical compounds. The same convention, in the absence of a designation to the contrary, is to be applied to the chemical names appearing in the specification and claims. Thus, where a chemical name does not specify which optical form is intended, the name is to be interpreted in its generic sense, that is, as meaning either the D-optical isomer, the L-optical isomer or the optically racemic DL-form.

In the first step of the process set forth above, the benzyl ester of glutamic acid is treated with at least one equivalent, and preferably an excess, of a halogenating agent such as thionyl chloride, phosphorus pentachloride, phosphorus pentabromide, phosphorus trichloride or phosphorus tribromide. When a phosphorus halide is employed as a halogenating agent, the corresponding acyl halide, particularly acetyl chloride or bromide, is conveniently employed as a solvent and the reaction is carried out below 50° C., preferably at room temperature. Inert organic solvents such as hydrocarbons, chlorinated hydrocarbons, cyclic ethers and the like can also be used. Specific examples of these solvents are benzene, toluene, dioxane, ethylene dichloride, etc. For the reaction employing thionyl chloride, a temperature below 70° C. is preferred. The optimal temperature is in the range from 20 to 50° C. Although a solvent for the reaction is ordinarily unnecessary, various solvents such as hydrocarbons, chlorinated hydrocarbons, cyclic ethers and the like can be used. Specific examples of solvents which can be used are benzene, toluene, dioxane, ethylene dichloride, etc.

The reaction between the 4-carbobenzoxy-4-aminobutyryl halide hydrohalide and diazomethane is carried out in the cold, that is, below 20° C. and preferably in the range of −5 to 10° C., in an inert anhydrous organic solvent. At least three equivalents of diazomethane are employed and suitable precautions are taken since this material is toxic and possesses explosive properties in the presence of oxygen, especially at elevated temperature. Hydrocarbons such as benzene, toluene and the like, lower aliphatic ethers, cyclic ethers such as dioxane, tetrahydrofuran and the like can be employed as solvents.

The hydrolysis of the resultant benzyl ester of 6-diazo-5-oxonorleucine is carried out in an aqueous medium under alkaline conditions below 30° C., preferably in the presence of a water-miscible organic solvent. As alkaline agents, alkali metal or alkaline earth metal hydroxides, carbonates, bicarbonates, oxides, alkoxides, amides and the like can be employed. Preferably, a dilute solution, containing from 1.0 to 1.1 equivalents, of an alkali metal hydroxide such as sodium hydroxide or potassium hydroxide is employed at a temperature in the range from 22 to 25° C. for one hour following which the temperature is lowered to 0° C. for about ten to twenty hours. Subsequent to hydrolysis, the reaction mixture is neutralized with acid below room temperature, preferably between −10 to 5° C. For this purpose an acid such as hydrochloric acid, hydrobromic acid, sulfuric acid, phosphoric acid, acetic acid and the like, may be employed. Neutralization is accomplished by carefully lowering the pH into the range of 5.5 to 7, the range of 6 to 6.5 being preferred.

The 6-diazo-5-oxonorleucines produced by the process of the invention possess phytotoxic and other interesting properties. They are particularly useful as herbicides, deweeding agents and the like. For this purpose, a dilute aqueous solution is employed and the solution applied to the plant or plant crop in accordance with methods which are known in the art. The compounds are effective in high dilution and in addition have a selective action against certain undesirable weed species. For example, in the case of L-diazo-5-oxonorleucine, an aqueous solution at a concentration of 1,000 parts per million applied in a spray to the point of drip off to separate vigorously growing test plots of lambsquarter and pigweed gives 100% kills whereas the growth of a comparable plot of corn is inhibited to the extent of only 20% under identical conditions.

The 6-diazo-5-oxonorleucine benzyl esters with which this invention is concerned are useful as intermediates for the production of the 6-diazo-5-oxonorleucines. The method by which these compounds can be converted to the 6-diazo-5-oxonorleucines has been described above. The invention is illustrated by the following examples:

Example 1

2.3 grams of L-glutamic acid, α-benzyl ester [Sachs and Brand, J. Am. Chem Soc. 75, 4610 (1953)] is added with stirring at 22–25° C. to a mixture of 2.1 g. of phosphorus pentachloride and 20 ml. of acetyl chloride. A clear solution results in about one hour. After standing three hours at 22–25° C. the solution is evaporated in vacuo. The residual product, L-4-carbobenzoxy-4-aminobutyryl chloride hydrochloride, has the formula,

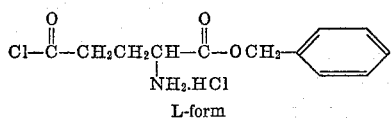
L-form 2.7 grams of L-4-carbobenzoxy-4-aminobutyryl chloride hydrochloride is slowly added to a solution of three equivalents of diazomethane in 100 ml. of ether, at 0–5°. The mixture is then allowed to warm to 22–25° C., and the solvent is then removed in vacuo. The residual product, L-6-diazo-5-oxonorleucine, benzyl ester, has the formula,

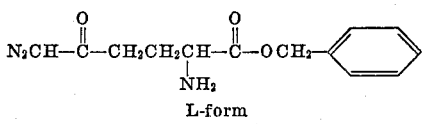
L-form

The L-6-diazo-5-oxonorleucine, benzyl ester prepared above is dissolved in 50–100 ml. of methanol and 20 ml. of 0.5 N sodium hydroxide is slowly added to the solution. The mixture is allowed to stand one hour at 22–25° C. and then sixteen hours at 0° C. The pH of the reaction mixture is adjusted to 6 with glacial acetic acid at 0–5° C. and the solution is passed through an adsorption column containing 60 g. of activated carbon and 60 g. of diatomaceous earth. The column is eluted with two and one-half hold-up volumes of 1% aqueous acetone and the eluate is collected in 10 ml. fractions. The three fractions showing the strongest ultraviolet absorption at a wave-length of 275 millimicrons are frozen and the ice sublimed from the frozen mass under high vacuum. The residual product, L-6-diazo-5-oxonorleucine, is recrystallized by dissolving in a minimal amount of water and adding five volumes of warm ethanol. The ultraviolet absorption spectrum of the product shows two maxima, one of $$E^{1\%}_{1\,cm.} = 683 \text{ at } 274 \text{ millimicrons}$$

and another of $$E^{1\%}_{1\,cm.} = 376 \text{ at } 244 \text{ millimicrons}$$

Optical rotation $[\alpha]_{26}{}^D = +21°$ (5.4% in water).

Example 2

4.6 g. of DL-glutamic acid, α-benzyl ester is added with stirring to a mixture composed of 4.2 g. of phosphorus pentachloride and 40 ml. of acetyl chloride and the resulting mixture stirred for about three hours. The mixture is evaporated to dryness in vacuo to obtain the desired DL-4-carbobenzoxy-4-aminobutyryl chloride hydrochloride of formula,

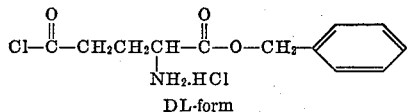
DL-form

The DL-4-carbobenzoxy-4-aminobutyryl chloride hydrochloride prepared above is added to 200 ml. of ether containing three equivalents of diazomethane keeping the temperature at 0–5° C. The reaction mixture is allowed to warm to 25° C. and the solvent removed by distillation in vacuo. The residue consists of the desired DL-6-diazo-5-oxonorleucine, benzyl ester of formula,

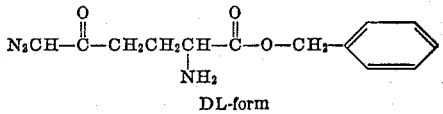
DL-form

The DL-6-diazo-5-oxonorleucine benzyl ester prepared above is dissolved in 100 ml. of methanol and 40 ml. of 0.5 ml. of 0.5 N sodium hydroxide is added slowly to the solution. The mixture is allowed to stand for one hour at room temperature and then for sixteen hours at 0° C. Glacial acetic acid is added at 0 to 5° C. to the solution containing the DL-6-diazo-5-oxonorleucine sodium salt until the pH reaches 6. The solution containing the desired DL-6-diazo-5-oxonorleucine is passed through an adsorption column containing 120 g. of activated carbon and 120 g. of diatomaceous earth. The column is eluted and the product isolated and purified as described in Example 1. The DL-6-diazo-5-oxonorleucine so obtained shows the same ultraviolet absorption spectrum as the L-6-diazo-5-oxonorleucine prepared in Example 1 but unlike this product the DL-6-diazo-5-oxonorleucine is optically inactive.

By using the α-benzyl ester of D-glutamic acid in the foregoing procedure one obtains D-6-diazo-5-oxonorleucine.

We claim:

1. A 6-diazo-5-oxonorleucine, benzyl ester of formula,

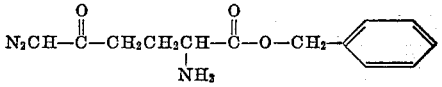

2. DL-6-diazo-5-oxonorleucine, benyl ester.
3. L-6-diazo-5-oxonorleucine, benzyl ester.
4. Process for the production of 6-diazo-oxonorleucine which comprises subjecting an α-benzyl ester of glutamic acid to halogenation, reacting the resulting 4-carbobenzoxy-4-aminobutyryl halide hydrohalide with diazomethane, hydrolyzing the resulting benzyl ester of 6-diazo-5-oxonorleucine and neutralizing the product of hydrolysis.
5. Process according to claim 4 wherein at least one equivalent of a halogenating agent is employed at a temperature below 50° C.
6. Process according to claim 4 wherein at least three equivalents of diazomethane are employed at a temperature below 20° C. in an anhydrous solvent.
7. Process according to claim 4 wherein the hydrolysis is carried out under alkaline conditions in an aqueous medium at a temperature below 30° C.
8. Process according to claim 4 wherein neutralization is accomplished by adjusting the pH to 5.5 to 7.

References Cited in the file of this patent

FOREIGN PATENTS

| | | |
|---|---|---|
| 550,604 | Belgium | Dec. 16, 1956 |
| 2529/56 | Union of South Africa | Aug. 3, 1956 |

OTHER REFERENCES

Chem. and Eng. News, Apr. 30, 1956, p. 2116.
Sheehan: J. Am. Chem. Soc., vol. 72, p. 2470 (1950).
Anson: Advances in Protein Chemistry, vol. XII, page 475 (1957).